(12) United States Patent
Theegala

(10) Patent No.: US 9,284,705 B2
(45) Date of Patent: Mar. 15, 2016

(54) OIL—WATER SEPARATOR

(75) Inventor: Chandra S. Theegala, Baton Rouge, LA (US)

(73) Assignee: Board of Supervisors of Louisiana State University And Agricultural and Mechanical College, Baton Rouge, LA (US)

( * ) Notice: Subject to any disclaimer, the term of this patent is extended or adjusted under 35 U.S.C. 154(b) by 445 days.

(21) Appl. No.: 13/700,179

(22) PCT Filed: May 25, 2011

(86) PCT No.: PCT/US2011/037880
§ 371 (c)(1),
(2), (4) Date: Mar. 7, 2013

(87) PCT Pub. No.: WO2011/150043
PCT Pub. Date: Dec. 1, 2011

(65) Prior Publication Data
US 2013/0193048 A1    Aug. 1, 2013

Related U.S. Application Data

(60) Provisional application No. 61/349,329, filed on May 28, 2010.

(51) Int. Cl.
*B01D 17/025* (2006.01)
*C02F 1/40* (2006.01)
*E02B 15/04* (2006.01)
*B01D 17/02* (2006.01)
*C02F 1/48* (2006.01)
*C02F 101/32* (2006.01)

(52) U.S. Cl.
CPC .......... *E02B 15/048* (2013.01); *B01D 17/0208* (2013.01); *B01D 17/0214* (2013.01); *C02F 1/40* (2013.01); *C02F 1/48* (2013.01); *C02F 2101/32* (2013.01); *C02F 2101/325* (2013.01)

(58) Field of Classification Search
CPC .... B01D 17/0208; B01D 17/0214; C02F 1/40
USPC .............. 210/519, 521, 522, 532.1, 538, 539, 210/540, 170.05; 96/182, 183
See application file for complete search history.

(56) References Cited

U.S. PATENT DOCUMENTS

| | | | | |
|---|---|---|---|---|
| 1,574,157 A | * | 2/1926 | Knight et al. | 210/537 |
| 1,777,535 A | * | 10/1930 | Stratford | 96/183 |
| 3,080,057 A | * | 3/1963 | Mobley | 210/532.1 |
| 3,688,904 A | * | 9/1972 | Knepp | 210/800 |

(Continued)

OTHER PUBLICATIONS

ACS Separations and Mass Transfer Products, *Liquid-Liquid Coalescer Design Manual* (date unknown, available at people.clarkson.edu/~wwilcox/Design/coalesc.pdf).

(Continued)

*Primary Examiner* — Christopher Upton
(74) *Attorney, Agent, or Firm* — John H. Runnels

(57) ABSTRACT

A separator is disclosed that may be used to separate oil from water in situ in the ocean or other water body. The difference in density between oil and water causes them to separate between two limbs of the apparatus, and to exit from different ports at different heights. The input may contain oil:water in essentially any ratio. The apparatus may be placed within a boat or ship, or it may be mounted on pontoons or other floatation gear and towed behind a boat or ship.

9 Claims, 3 Drawing Sheets

(56) References Cited

U.S. PATENT DOCUMENTS

| | | | | |
|---|---|---|---|---|
| 3,862,039 A | * | 1/1975 | Summers | 210/540 |
| 4,938,878 A | * | 7/1990 | Hall | 210/521 |
| 5,073,266 A | * | 12/1991 | Ball, IV | 210/519 |
| 5,149,434 A | * | 9/1992 | Essop | 210/521 |
| 5,236,585 A | | 8/1993 | Fink | 210/242.3 |
| 5,286,383 A | * | 2/1994 | Verret et al. | 210/521 |
| 5,312,552 A | | 5/1994 | Norman et al. | 210/741 |
| 5,468,385 A | | 11/1995 | Inoue | 210/243 |
| 7,014,757 B2 | * | 3/2006 | Rhodes | 210/521 |
| 7,520,393 B2 | * | 4/2009 | Driggers | 210/521 |
| 8,501,014 B2 | * | 8/2013 | Byskov | 210/521 |
| 2004/0016690 A1 | * | 1/2004 | Miyazawa et al. | 210/265 |
| 2004/0226879 A1 | | 11/2004 | Redding | 210/512.1 |

OTHER PUBLICATIONS

"Fluid Statics," University of Texas at Austin ChE 354 slides (date unknown, available at tinyurl.com/3e32cx8).

Gavhane, K., *Unit Operations—I, Fluid Flow and Mechanical Operations,* pp. 7.13-7.15 (2009) (available at tinyurl.com/429mvqc).

Zanker, A., "Gravity Settlers, Sizing of Decanters," in J. McKetta (Ed.), *Unit Operations Handbook, vol. 2, Mechanical Separation and Materials Handling* (1993) pp. 136-137 (available at tinyurl.com/3otb8he).

* cited by examiner

OIL—WATER SEPARATOR

This is the United States national stage of international application PCT/US2011/037880, international filing date May 25, 2011, which claims the benefit of the May 28, 2010 filing date of U.S. provisional patent application Ser. No. 61/349,329 under 35 U.S.C. §119(e).

TECHNICAL FIELD

This invention pertains to an apparatus and method for separating immiscible liquids, particularly to an apparatus and method for separating oil and water with an apparatus that is adapted to operate on the waves in situ, for example in remediating an oil spill.

BACKGROUND ART

During the catastrophic 2010 Gulf of Mexico oil spill, an estimated 600,000 gallons (2,300,000 liters) of sub-sea chemical dispersants were deployed. The long term effects of these dispersants are not known. Attempts were also made to skim oil at the surface, but only small amounts were actually recovered this way. There is an unfilled need for improved techniques to recover oil that has been spilled in the ocean or other bodies of water.

In calm waters, containment booms are relatively effective at containing surface oil. However, the contained oil still must be collected or burned before the oil layer becomes too thick, or before the sea turns rough. Burning the oil has it own environmental repercussions. It would be far preferable to directly collect the oil and remove it from the environment entirely.

If possible, the recovery of spilled oil by mechanical means would almost always be preferable either to dispersing oil in the water column or to burning. Previous methods of mechanical recovery have generally involved booms to concentrate the oil, and skimmers to remove the oil from water. The effectiveness of skimmers can vary widely, depending on the skimmer system used, the thickness of the oil, and environmental conditions. Various methods of oil skimming exist. Most methods rely either on density differences between oil and water, or on the adhesive properties of oil.

One skimmer that was recently tested in the Gulf of Mexico, the "A Whale," used vented weirs along a 350-yard converted oil tanker to collect 21 million gallons of oil and water daily. The collected water and oil would be separated later. Apart from its relatively poor collection and separation efficiencies, the gargantuan approach represented by the "A Whale" is probably not practical in most circumstances. The "A Whale" might be analogized to a single, gigantic bee trying to collect honey from tens of thousands of flowers distributed over several square miles. It would be much more efficient to deploy hundreds of smaller bees, an armada or network of smaller or medium-sized skimmers.

Another prior approach is to use a centrifugal separator, such as that of Costner Industries, which employs high centrifugal forces to separate lighter oil from denser water. However, the complexity and energy requirements of such an approach are a major concern. Also, scale-up may be difficult.

Most prior approaches have relied upon collecting oil and water mixtures in barges or in large tanks, and then processing the mixtures onshore to separate oil from water. This approach is inherently slow, difficult, and inefficient. What is collected in the ocean by skimmers typically contains 95% or more water, meaning that the vast bulk of the weight is transported back to land "unnecessarily." Relatively few prior approaches have attempted to perform separations in situ, while the separator is still actively deployed at sea.

Continuous gravity decanters have previously been used to separate liquids, by allowing liquids to settle to different levels within a generally hollow decanter, based upon differences in the densities of the liquids. To the inventor's knowledge, previous continuous gravity decanters have been used only in more-or-less fixed settings—i.e., either on land or affixed to an offshore platform. To the inventor's knowledge, a continuous gravity decanter has never previously been used for in situ separations of oil and water while a separator is actively deployed at sea, on the waves. See, e.g., "Fluid Statics," University of Texas at Austin ChE 354 slides (date unknown, available at tinyurl.com/3e32cx8); K. Gavhane, *Unit Operations-I, Fluid Flow and Mechanical Operations*, pp. 7.13-7.15 (2009) (available at tinyurl.com/429mvqc); ACS Separations and Mass Transfer Products, *Liquid-Liquid Coalescer Design Manual* (date unknown, available at people.clarkson.edu/~wilcox/Design/coalesc.pdf); and A. Zanker, "Gravity Settlers, Sizing of Decanters," in J. McKetta (Ed.), *Unit Operations Handbook*, vol. 2, *Mechanical Separation and Materials Handling* (1993) pp. 136-137 (available at tinyurl.com/3otb8he).

DISCLOSURE OF THE INVENTION

I have discovered an oil-water separator that may be used to separate oil from water in situ, while deployed on the ocean or other body of water. Oil and water are separated in situ, rather than being collected in a tank or barge to be transported for later separation onshore. Separation is relatively rapid and efficient. Oil is lighter than water. This difference in density is exploited to cause the oil and water to separate between two limbs of the apparatus, and to collect the oil and water from two different ports. An "oil-out port" on one limb is higher than a "water-out port" on the other limb. Only oil, not water, will reach the level of the higher "oil-out port" against gravity, because of the differential densities of the two liquids. The oil-out port releases essentially oil and only oil, irrespective of the ratio at which oil and water enter the apparatus. The input may contain oil:water in essentially any ratio at which the two liquids are immiscible, from nearly all water with little oil, to nearly all oil with little water, or any ratio in between. The apparatus may be placed within a boat or ship, or it may be mounted on pontoons or other floatation gear and towed behind a boat or ship. A low-shear pump is employed to minimize the formation of emulsions as fluid is pumped into the apparatus. The dimensions and configuration of the limbs of the apparatus are preferably configured to make the apparatus stable when deployed in ocean waves.

In one embodiment, the novel separator comprises two principal limbs, which will sometimes be called the "left" limb and the "right" limb for convenience of reference. (There is nothing unique about the labels left and right per se. The two limbs could alternatively be called the first and second limbs, or the oil and water limbs, etc.) A mixture of water and oil, typically with entrained air bubbles as well, enters the separator through a port on the lower portion of the left limb. See FIG. 1. A gentle action, low-shear pump (such as an engine driven diaphragm pump, for example an Izumi Sludge Pump, Model #SMD-80HX, or a peristaltic pump, or another gentle action, positive displacement pump) pumps the oil-water (or oil-water-air) mixture into the device. By contrast, a "regular," or centrifugal pump would typically turn an oil-water or oil-water-air mixture into an emulsion, which is undesirable because an emulsion can require hours or even days to re-separate. The pump preferably has self-priming capabilities, and can work over a range of ratios of oil, fresh water, salt water, and air. If oil and water are introduced without forming an emulsion, the separation may be made more rapidly and easily, without the need for expensive and energy-intensive centrifuges. The device is energy-efficient compared to other means available for oil-water separations. The low-shear pump should produce output having laminar flow, i.e., with a Reynolds number less than about 2,100.

Once the oil-water-air mixture enters the left chamber, the air floats to the surface relatively quickly. Due to the buoyancy of the air, most of the air can escape as bubbles through an optional inner tube within the left limb. However, a fraction of the air will not enter the inner tube but will instead reach the top surface of the liquid by bubbling through the space between the inner tube and outer wall of the left limb. The fraction of air passing between the inner tube and the outer wall of the left limb is preferably small enough that it induces no more than minimal turbulence in the floating oil layer, and does not substantially affect separator performance. An alternative option for air release is depicted in FIG. 2: In the alternative embodiment air in the inlet line is released before the oil-water mixture enters the main chamber of the separator, thereby minimizing turbulence in the left limb. Additionally, it is preferred to configure the intake to minimize the amount of air that is introduced into the system initially.

Because oil is lighter than water, the oil floats upward in the left limb. The pumping can not only induce flow of the liquids, it can also cause shear. Shear is undesirable because it tends to reduce the size of oil droplets, which in turn slows the velocity of the ascent of oil droplets in the left limb. It is therefore preferred to use a low shear pump. Additionally, it is preferred that the diameter of the left limb should be larger than that of the right limb, both to increase the hydraulic retention time in the left limb, and also to lower turbulence in the left limb.

Having a larger diameter in the left limb improves separation efficiency. The entrance of the device is the area that tends to have the highest turbulence. Thus reducing the velocity at the entrance can significantly enhance oil/water separation. It is preferred that the linear velocity of flow should not exceed about 15 inches (40 cm) per minute when separating mixtures of crude oil and sea water. This velocity may vary, depending on particular specific gravities, viscosities, and other physical or chemical properties. Using a low-shear pump helps reduce turbulence. Having a large diameter in the left limb also helps reduce turbulence. However, a larger diameter for the left limb also increases the overall weight of the device (both material weight and liquid weight). Some very fine oil droplets and emulsions may be carried along with the exiting water into the right chamber and through the water-out port; by minimizing turbulence, the amount of oil carried to the water-out port may be minimized.

Preferably, the right limb is substantially narrower than the left limb to reduce weight, as neither the hydraulic retention time nor a laminar flow regime in the right limb has much effect upon oil separation. Stated differently, all separation has occurred before any liquid enters the right limb. The right limb essentially needs to have only enough volume and diameter to provide a stable and consistent pressure head, as depicted in the figures; and a sufficient diameter to accommodate the flow of exiting water, without imposing substantial hydraulic resistance to that flow.

MODES FOR PRACTICING THE INVENTION

Figure 1:
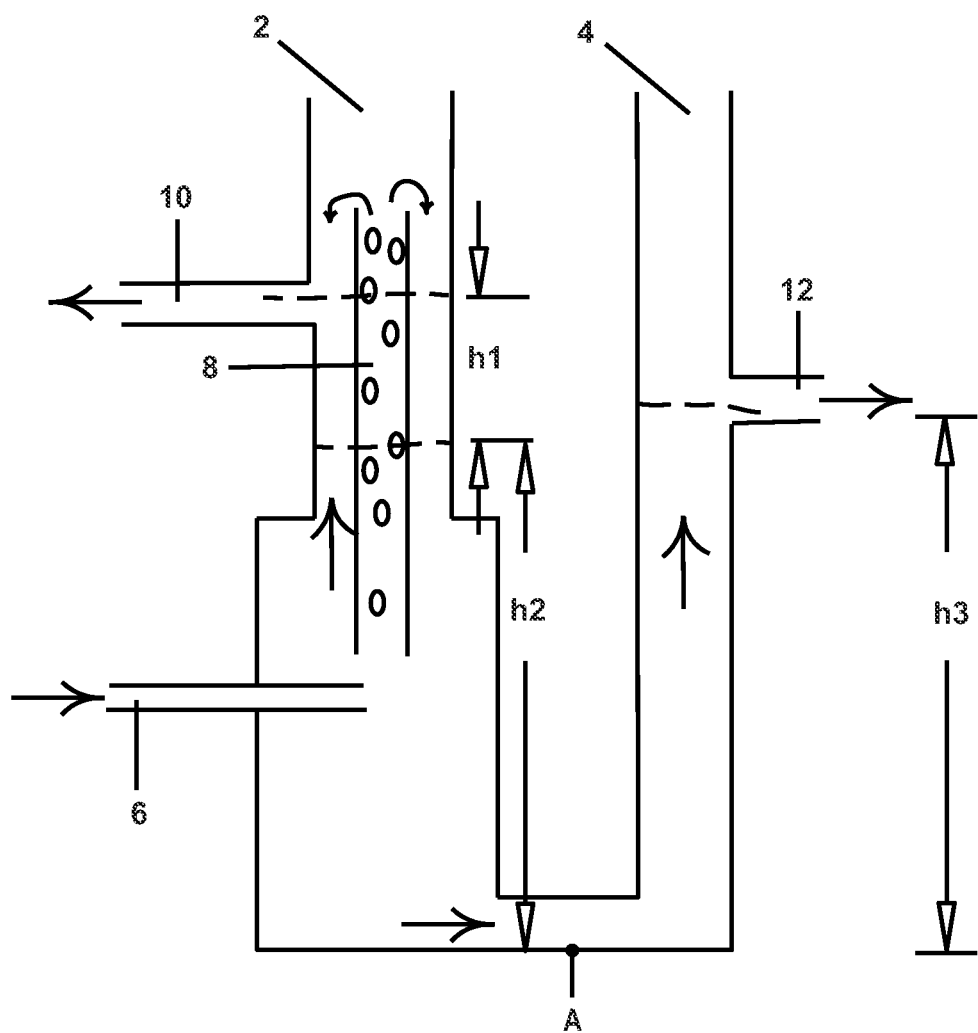
FIG. 1 depicts schematically one embodiment of an oil-water separator in accordance with the present invention.

Looking for example at FIG. 1, in one embodiment a separator in accordance with the invention may be thought of as having a configuration generally as that of a large U tube. At the point marked "A," the pressure from the left limb 2 ($\rho_{oil} \times g \times h_1 + \rho_{H2O\text{-}mostly} \times g \times h_2$) equals the pressure from the right limb 4 ($\rho_{H2O} \times g \times h_3$). The Greek letter $\rho$ denotes the density of the particular fluid. The density of oil is less than the density of water (whether fresh or salt water). The invention exploits this difference in density to separate the oil and water between the two limbs 2 and 4, and to collect the oil and the water from two different ports, 10 and 12, respectively. The oil-out port 10 on the left limb 2 is higher than the water-out port 12 on the right limb 4. Therefore, oil exits the oil-out port 10 only when the height of the oil layer in the left limb ($h_1$) is sufficient to reach the oil-out port 10. Air or other gases in the intake may escape as bubbles through an optional inner tube 8 within the left limb 2. The oil-out port 10 releases essentially oil (and only oil), regardless of the ratio at which oil enters the device. The input 6 may receive oil:water in essentially any ratio at which the two liquids are immiscible, from nearly all water with little oil, to nearly all oil with little water, or any ratio in between. If the intake has a 1:1 oil-to-water ratio, then the oil-out port 10 will deliver the 50% of the intake that is oil. Or if the intake is only 1% oil, then the oil-out port 10 delivers that 1%, i.e., the oil; and the remaining 99%, i.e., the water, goes to the water-out port 12. If no oil enters the unit at all, then the oil-out port 10 will have no discharge. Separation efficiencies that have been experimentally observed with a prototype device have been 99% or greater. The device may be readily scaled up, and is suitable for on-shore, shallow water, deep sea, fresh water, and salt water applications.

Figure 2:
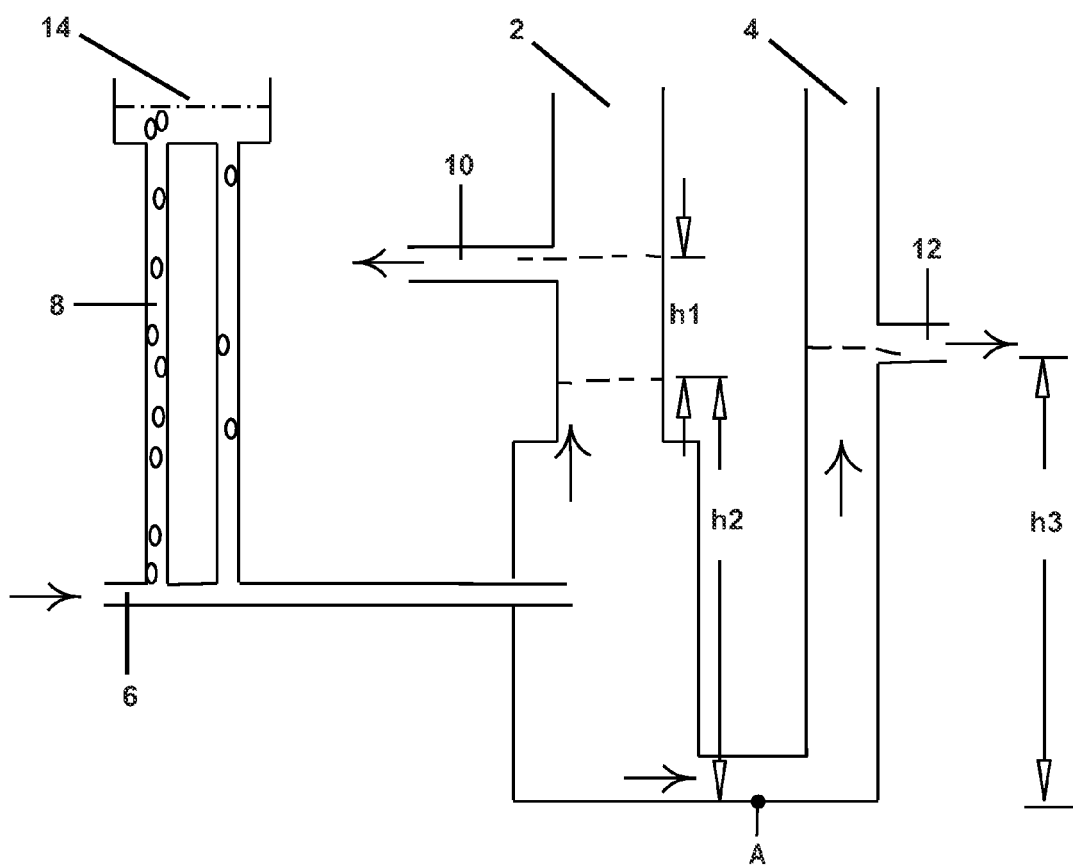
FIG. 2 depicts schematically an alternative embodiment, in which at least some air in the inlet line is released before the oil-water mixture enters the main chamber, thereby minimizing turbulence in the left limb of the separator.

FIG. 2 depicts an alternative embodiment in which the components and their relationships to one another are generally similar to those depicted in FIG. 1, except that to release gas bubbles inner tube 8 has been replaced by conduit 14. Gas in the inlet line 6 is released before the oil-water mixture enters left limb 2, thereby minimizing turbulence in left limb 2. Note that escape conduit 14 has an elevation substantially above that of oil-out port 10 in order to minimize circulation of oil or water within escape conduit 14, simply because the pressure head within conduit 14 will inhibit the circulation of liquid into the conduit.

Figure 3:
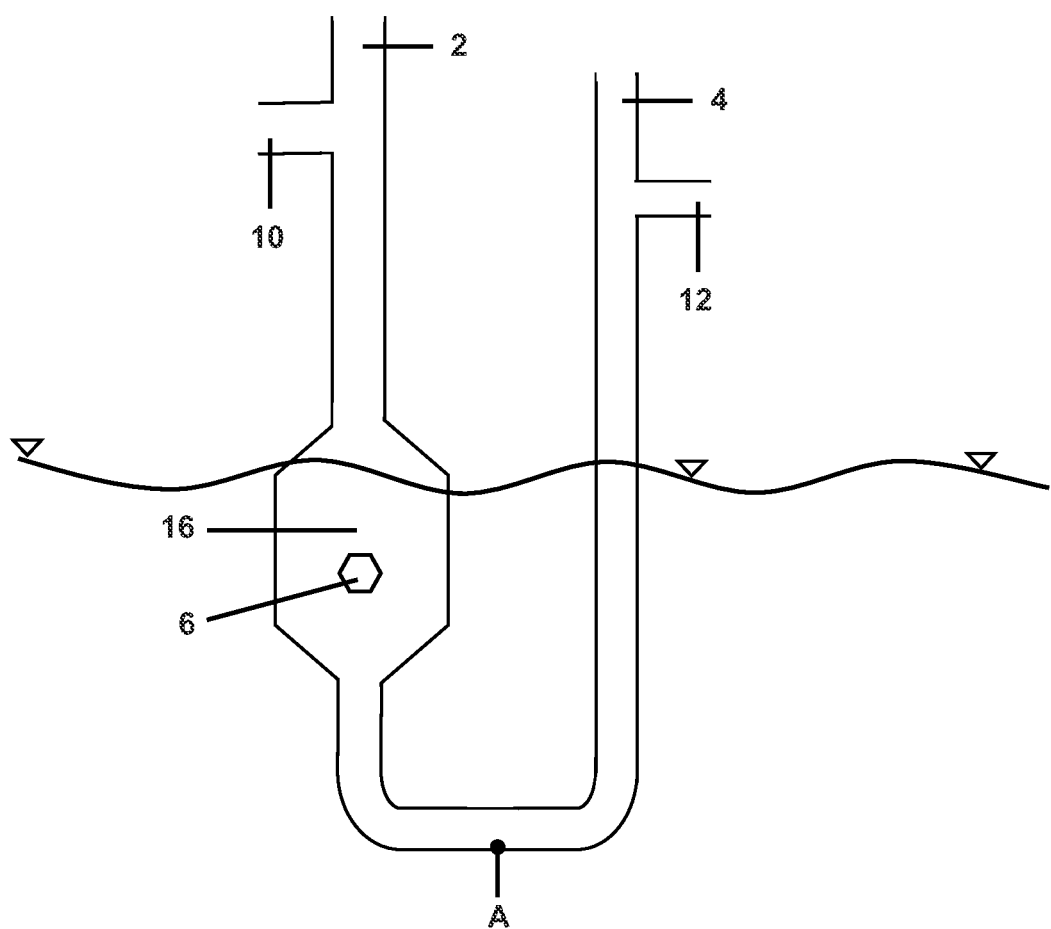
FIG. 3 depicts schematically an alternative embodiment, in which a portion of the left limb is enlarged, to reduce the center of gravity of the unit as a whole, and to reduce turbulence in the left limb, without unnecessarily enlarging those portions of the unit that have an insignificant effect upon turbulence, and that can be made smaller without adversely affecting separation efficiency.

To lower the overall weight of the device, and also to facilitate a smaller pontoon/floating platform, the diameter of the left limb may optionally be reduced in less critical sections, as illustrated (very schematically) in FIG. 3. The widest section 16 of left limb 2 may optionally be fully or partially submerged to improve the stability or seaworthiness of the floating platform or pontoon. Submersing the separator can also help to lower shearing from the pump, as the height of the pumping head is lowered.

The novel device may be used to clean oil spills in the ocean, a lake, or other body of water; or it may also be used in other settings such as for the industrial separation of oily water. More generally, it may be used to separate any two immiscible liquids that have a substantial difference in densities. The simplicity and robustness of the design makes the novel device ideally suited for deployment and in situ separation of oil from water in the ocean or other water bodies. The novel device may readily be operated in a moving boat or ship, or while being towed behind a boat or ship. A plurality of devices in accordance with the invention (an "armada") may be deployed throughout a region to remediate oil across an area in which oil has been spilled.

Two sample calculations are given below, to illustrate examples of the relationship between limb height and oil layer height for realistic sets of parameters:

Sample Calculation 1
Right limb (height difference from bottom to water-out port)=10 feet (3.05 meters)
Oil port elevation (elevation of oil-out port above water-out port)=0.75 feet (22.9 centimeters)
Oil Specific Gravity=0.9
Water Specific Gravity (salt water)=1.03
"Mostly Water" Specific Gravity ($h_2$)=1.0

$$\text{From FIG. 1: } h_1 + h_2 - 0.75 \text{ ft} = h_3 = 10 \text{ ft} \quad \text{(Eq. 1)}$$

At point A, pressure from left limb=pressure from right limb:

$$(\rho_{oil} \times g \times h_1 + \rho_{H2O\text{-}mostly} \times g \times h_2) = (\rho_{H2O} \times g \times h_3) \quad \text{(Eq. 2)}$$

Cancelling the common factor of g from Eq. 2:

$$(\rho_{oil} \times h_1 + \rho_{H2O\text{-}mostly} \times h_2) = (\rho_{H2O} \times h_3) \quad \text{(Eq. 3)}$$

Substituting the numerical values into Eq. 3:

$$0.9 h_1 + 1.0 h_2 = 1.03 \times 10 \text{ ft} \quad \text{(Eq. 4)}$$

Eq. 1 and Eq. 4 are thus two equations with two unknowns. Solving them gives as solution: $h_1$=4.5 feet (1.37 meter) and $h_2$=6.25 feet (1.91 meter).

Sample Calculation 2
Right limb (height difference from bottom to water-out port)=15 feet (4.57 meters)
Oil port elevation (elevation of oil-out port above water-out port)=1.0 foot (30.5 centimeters)
Oil Specific Gravity=0.9
Water Specific Gravity (salt water)=1.03
"Mostly Water" Specific Gravity ($h_2$)=1.0
Following the same procedures as shown above for Sample Calculation 1, the solution is $h_1$=5.5 feet (1.68 meter) and $h_2$=10.5 feet (3.20 meter).

The concepts outlined above lead to the following observations, conclusions, and preferred operating parameters:

A higher oil-out port elevation (higher, that is, compared to the elevation of the water-out port) requires both a taller left limb and a taller right limb.

A higher difference in the densities of the oil and the water allows for shorter limb heights at the same separation efficiency; or for better separation efficiency at the same limb heights.

With a higher flow rate it is preferable to have a larger diameter chamber, particularly in the left limb.

When smaller oil droplets and emulsions are present, a higher fraction of oil will escape through the water-out port; or a longer settling time will be required in the left limb to allow better separation.

When the separator is used under conditions where there are rough waves or turbulent seas, it is preferable to use a higher oil-out port elevation (higher, that is, with reference to the water-out port), to minimize the amount of water escaping through the oil port. However, a higher oil-out port also requires longer limbs overall, which in turn could make the floating vessel more top-heavy and liable to capsize. To enhance vessel stability and lower the center of gravity, the left limb may optionally be narrowed both above and below the most turbulent region (i.e., above and below the zone close to the inlet port). Also, the device may be designed so that the inlet port and the wider portions of the device are below the surface of the water. See FIG. 3. As another alternative, for applications that are entirely underwater, a single diameter tube may be used, as the chances of toppling are generally lower underwater than for a vessel that operates upon the surface.

A submerged or partially submerged separator requires less pumping, which in turn lowers the shear stress. Lower shear stress leads to larger oil globules, and to faster and more efficient separation. Preferably, the inlet port is below or close to the sea level (or other water level) to help reduce shear.

In turbulent seas, more than 1 foot (30 cm) or more of up/down motion can be expected. However, as both limbs are subjected to approximately the same up/down motion, a fairly modest oil-out port height differential (approximately 6-12 inches, or 15-30 cm above the water-out port) should suffice for most conditions. Because several feet of oil ($h_1$, typically a meter or more) are present in the left limb, rocking action in the sea will generally not push water up through the oil-out port (as long as a reasonable quantity of oil is being drawn into the skimmer)

Two prototype devices in accordance with the invention have been successfully built and tested in the laboratory. The first prototype had a throughput of 2 gallons (7.6 liters) per minute, and the second had a throughput of 70 gallons (265 liters) per minute. Mixtures of used vegetable oil, motor oil, or biodiesel with water have been tested in one or both prototypes. For example, in a test of the smaller prototype, about 5-6 gallons (21 liters) of oily product were poured on top of tap water to fill a 55 gallon (208 liter) barrel. A peristaltic pump with a 0.5 inch (1.3 cm) inner diameter clear tubing was used to draw a mixture of water, oil, and air from the top surface of the liquid within the barrel, at an adjustable pumping rate. Air from the mixture was released through an external vent. The water/oil mixture entered the bulb section of the left limb. The oil content in the water exiting the right limb, and the water content in the oil exiting the left limb were quantified volumetrically by collecting 1 liter samples. Each collected sample settled overnight in an air-tight separatory funnel. For the water samples (tested for oil), the bottom water fraction was drawn out without discharging the floating oily layer. The remaining mixture was then again allowed to separate for 2 hours, followed by successive separation. This process was continued until no distinct water layer was noticed after 2 hours further setting. The mass and volume of the remaining oil were then measured. For oil samples (tested for water), the bottom water layer was drawn out and measured. The measurements indicated that the oil separation efficiency and the water separation efficiency both exceeded 99%. Indeed, the water content in the oil was essentially negligible.

The 70 gpm prototype was mounted on a purpose-designed and built pontoon boat. This prototype device, mounted on pontoons, has been successfully tested for seaworthiness by being towed by a boat both in a local lake, and in the Gulf of Mexico in 3-4 foot seas. Actual field testing had not been conducted as of the filing date of this patent application, due to regulatory difficulties in obtaining the necessary environmental permits to deliberately spill oil in the environment, even in limited quantities and even for the specific purpose of testing remediation techniques. However, in laboratory testing under simulated conditions, the 70 gallon-per-minute unit has successfully separated used cooking oil with a specific gravity around 0.91 from water at an efficiency greater than 99%.

Optionally, the separator may be mounted on or within a self-propelled vessel, or it may be towed by a small boat. Floating oil may initially be collected in a floating bag towed behind a vessel before being pumped into the separator. Floating booms may be used to improve collection efficiency. Optionally, smaller motors (such as "trolling motors") may be used to steer vessels in close proximity to an oil spill to maneuver the vessels without generating a large wake. A flotilla of many boats containing or towing many devices in accordance with the present invention may be deployed to rapidly collect and separate large volumes of oil released in a large oil spill.

To improve the trapping efficiency of small oil droplets (e.g., having a diameter less than about 100 µm), an optional coalescer may be employed, such as for example HOH Corporation's Cube® coalescer. A coalescer intercepts small droplets from a liquid stream and provides conditions to enhance droplet growth and aggregation. Enhancing droplet growth and aggregation helps improve separation efficiency for any extra fine oil droplets that may be mixed into exiting water. Using a coalescer pack may also allow one to reduce the size of the left limb, making the overall system more compact. Another optional embodiment to improve separation efficiency is to introduce the oil/water mixture into the left limb at a direction that is initially tangentially to the walls of the chamber, so that the flow creates a low-velocity vortex or spin. The resulting rotation creates a gentle centrifugal force, pushing heavier components outwards. The lighter components tend to move closer to the axis and then to move upward due to their lighter density.

Another optional feature is to introduce a fine mist of diffused air or other gas into the left limb, for example with a compressor and a diffuser, to enhance the lifting of fine oil droplets. The air bubble sizes should be small, for example on the order of 30 µm to 2 mm, to minimize turbulence. Depending on the amount of air that is thus entrained in the liquid, it is possible in some instances that the bulk density in the left limb could be reduced to the sufficiently that the modified density should be taken into account in determining the height of the oil in the left limb: $h_1$, $h_2$, or both.

Another optional feature is to use electrostatic plates in the left limb to enhance oil-water separation. Electrostatic plates can assist in droplet growth and in emulsion breakdown. The electrostatic plates can be used alone, or in conjunction with coalescer packs or plates (i.e., an electro-coalescer). Depending on the particular application, purity requirements, or water discharge regulations, these components (electrostatic plates or electro-coalescer) may optionally be used either within the oil column or in bulb section of the left limb. The electrodes are typically flat and rectangular; but they may optionally be curved to assist in the flow of liquids in the left limb. Or the otherwise typically circular cross section of the left limb in the vicinity of the plates could be modified, for example to a square or rectangle, to accommodate multiple rectangular plates, held vertically in a parallel configuration. Alternatively, the plates can be designed as concentric hollow cylinders, with or without coalescer packs between the plates.

Natural surfactants can be present either in crude oil or in the aqueous environment. These naturally-occurring surfactants can promote the formation of emulsions when there is an oil spill. Another optional feature of the invention is to add emulsion-breaking compounds at the inlet port or in the left limb, to assist in breaking down emulsions or in separating oil from water. Many emulsion breakers are known in the art, including for example amine-based or butyl resin-based de-emulsifiers. De-emulsifiers may also be used to help dehydrate the collected oil. Additionally, "reverse emulsion" breakers may be used to de-oil the exiting water. Reverse emulsion breakers are also known in the art, including for example various organic coagulants and polyamines.

Miscellaneous

The complete disclosures of all references and publications cited in this disclosure are hereby incorporated by reference in their entirety, as is the entire disclosure of priority application 61/349,329. In the event of an otherwise irreconcilable conflict, the present specification shall control.

What is claimed:

1. Apparatus for separating a mixture of oil and water into two fractions: an oil fraction comprising primarily oil, and a water fraction comprising primarily water; wherein the oil fraction may optionally comprise one or more minor components in addition to oil, and wherein the water fraction may optionally comprise one or more minor components in addition to water; wherein said apparatus comprises:
   (a) a first chamber and a second chamber, wherein said first and second chambers are fluidly connected to one another only at or near the bottoms of said first and second chambers;
   (b) an inlet adapted to transport a mixture of oil and water from an external source into said first chamber;
   (c) a low-shear or non-emulsifying pump adapted to transport the mixture of oil and water from the external source, through said inlet, and into said first chamber;
   (d) an oil outlet adapted to transport the separated oil fraction from said first chamber; and
   (e) a water outlet adapted to transport the separated water fraction from said second chamber;
wherein:
   (f) said oil outlet has a higher elevation than said water outlet;
   (g) the respective elevations of said oil and water outlets above the fluid connection between said first and second chambers, and the dimensions of said first chamber are such that said apparatus is adapted to operate as follows:
      (i) said pump transports the mixture of oil and water from an external source, through said inlet, and into said first chamber; (ii) within said first chamber, the turbulence and velocity of fluid flow are sufficiently low that the mixture separates by density into an lighter, upper, oil fraction and a denser, lower, water fraction; (iii) the continued inflow of liquid forces liquid in the denser, lower, water fraction—but not liquid in the lighter, upper, oil fraction—to flow from said first chamber through the fluid connection into said second chamber, thereby separating a water fraction; (iv) the continued inflow of liquid forces liquid in the separated water fraction in said second chamber through said water outlet; (v) the continued inflow of liquid forces liquid in the separated oil fraction in said first chamber through said oil outlet; and (vi) the difference in elevation between said oil and water outlets, together with the difference in densities between the separated oil and water fractions, and the presence of the fluid connection between said first and second chambers ensure that essentially none of the water fraction reaches said oil outlet;

(h) a portion of said first chamber adjacent to said inlet is substantially wider than other portions of said first chamber; wherein the dimensions of the wider portion of said first chamber are sufficiently large to inhibit the development of turbulence within said first chamber; and wherein the narrower portions of said first chamber are at least sufficiently wide not to substantially impede the flow of liquid through said first chamber;

(i) said first and second chambers are dimensioned so that, when said apparatus is placed in a body of water, the center of gravity of said apparatus lies below the surface of the body of water, and so that the wider portion of said first chamber lies fully or partially below the surface of the body of water;

(j) said apparatus is adapted to be mounted in a ship or a boat, or is adapted to be towed in the water behind a ship or a boat; and (k) said apparatus is adapted to operate, as described in limitation (g) above, in situ, to separate a mixture of oil and water while said apparatus is moving on a body of water, without any necessity to first transport the mixture of oil and water onshore or to a stationary location before the oil fraction and water fraction are separated from one another.

2. Apparatus as in claim 1, wherein said inlet is adapted to transport a mixture of gas, oil, and water; and wherein said apparatus additionally comprises a vent with said first chamber or prior to said first chamber, wherein said vent is adapted to transport gas from the oil and the water, so that the presence of gas does not interfere with the separation of oil from water.

3. Apparatus as in claim 1, additionally comprising a vent within said first chamber and adapted to vent gases from liquids within said first chamber.

4. Apparatus as in claim 1, additionally comprising a vent connected to said inlet and adapted to vent gases from liquids within said inlet.

5. Apparatus as in claim 1, wherein said inlet is adapted to transport liquid into said first chamber in a direction tangent to the side of said first chamber, and wherein the shape of said first chamber is adapted to cause liquid entering said first chamber at velocity to go into a vortex, wherein the vortex assists in the separation of oil from water by density.

6. Apparatus as in claim 1, additionally comprising a coalescer within said first chamber adapted to enhance the aggregation of small oil droplets.

7. Apparatus as in claim 1, wherein said pump is adapted to transport the mixture of oil and water into said first chamber as a laminar flow with a Reynolds number less than about 2100.

8. Apparatus as in claim 1, wherein the vertical height of said first chamber is substantially greater than the horizontal width of said first chamber; wherein the vertical height of said second chamber is substantially greater than the horizontal width of said second chamber; and wherein said first chamber, said second chamber, and the fluid connection between said first and second chambers have a configuration generally of a U tube.

9. A combination device comprising the apparatus of claim 1, and pontoons or other floatation gear, wherein said apparatus is mounted on said pontoons or other floatation gear.

* * * * *